US012597723B2

(12) United States Patent
Dunbar et al.

(10) Patent No.: US 12,597,723 B2
(45) Date of Patent: Apr. 7, 2026

(54) CONTACT ASSEMBLY HAVING CABLE CONTACTS AND CONNECTOR CONTACTS

(71) Applicant: TE Connectivity Solutions GmbH, Schaffhausen (CH)

(72) Inventors: Blake Dunbar, Middletown, PA (US); Nitish Balakrishnan, Harrisburg, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 281 days.

(21) Appl. No.: 18/507,130

(22) Filed: Nov. 13, 2023

(65) Prior Publication Data

US 2025/0158304 A1 May 15, 2025

(51) Int. Cl.
*H01R 12/73* (2011.01)
*H01R 12/72* (2011.01)
*H01R 13/405* (2006.01)

(52) U.S. Cl.
CPC ........... *H01R 12/73* (2013.01); *H01R 12/721* (2013.01); *H01R 13/405* (2013.01)

(58) Field of Classification Search
CPC ..... H01R 12/73; H01R 12/721; H01R 13/425
See application file for complete search history.

(56) References Cited

U.S. PATENT DOCUMENTS

| | | | | |
|---|---|---|---|---|
| 4,932,885 A * | 6/1990 | Scholz | H01R 12/721 | 439/60 |
| 4,995,814 A * | 2/1991 | Weidler | H01R 25/162 | 439/856 |
| 6,524,119 B2 * | 2/2003 | Kato | H01R 27/02 | 439/497 |
| 6,652,322 B2 * | 11/2003 | Ito | H01R 12/721 | 439/857 |
| 6,722,915 B1 * | 4/2004 | McAlonis | H01R 12/721 | 439/493 |
| 7,473,140 B2 * | 1/2009 | Guan | H01R 12/721 | 439/637 |
| 8,657,631 B2 * | 2/2014 | Lang | H01R 12/716 | 439/660 |
| 9,531,129 B2 * | 12/2016 | de Boer | H01R 13/6471 | |
| 10,374,341 B1 * | 8/2019 | Phillips | H01R 12/73 | |
| 10,855,020 B1 * | 12/2020 | Phillips | H01R 12/721 | |
| 11,735,846 B2 * | 8/2023 | Phillips | H01R 12/721 | 439/631 |
| 2022/0336976 A1 * | 10/2022 | Henry | H01R 13/516 | |

* cited by examiner

*Primary Examiner* — Gary F Paumen

(57) ABSTRACT

A contact assembly includes a contact organizer having a central wall that includes a front slot configured to receive a card edge of a circuit card and a pass-through window through the central wall. The contact assembly includes upper and lower contact arrays of upper and lower contacts coupled to the central wall. The contacts include forward sections extending to the front slot to mate with the module circuit card and rearward sections with terminating ends. The contacts include cable contacts terminated to ends of cables and connector contacts terminated to a board connector. The terminating ends of the upper connector contacts pass through the pass-through window to an area below the central wall for termination to the board connector.

20 Claims, 8 Drawing Sheets

CONTACT ASSEMBLY HAVING CABLE CONTACTS AND CONNECTOR CONTACTS

BACKGROUND OF THE INVENTION

The subject matter herein relates generally to electrical connector assemblies.

Some communication systems utilize communication connectors, such as electrical connector assemblies to interconnect various components of the system for data communication. Some known communication systems use pluggable modules, such as I/O modules or circuit cards, which are electrically connected to the electrical connector assemblies. The pluggable modules have module circuit cards having card edges that are mated with the electrical connector assemblies during the mating operation. Each electrical connector assembly typically has an upper row of contacts and a lower row of contacts for mating with the corresponding circuit board. There is a need for connectors and circuit boards of communication systems to have greater contact density and/or data throughput. Typically, electrical connector assemblies are terminated directly to a host circuit board and communication lines pass from the pluggable module to the host circuit board through the electrical connector assembly. Signal degradation may occur through the communication lines passing through the host circuit board.

A need remains for an improved electrical connector assembly for a communication system.

BRIEF DESCRIPTION OF THE INVENTION

In one embodiment, a contact assembly is provided and includes a contact organizer having a central wall that includes an upper surface and a lower surface. The contact organizer includes a front slot at a front of the contact organizer configured to receive a card edge of a module circuit card of a pluggable module. The contact organizer includes a pass-through window through the central wall. The contact assembly includes an upper contact array coupled to the upper surface of the central wall of the contact organizer. The upper contact array includes upper contacts. The upper contacts include forward sections and rearward sections. The forward sections of the upper contacts extend to the front slot to mate with the module circuit card. The rearward sections have terminating ends. The upper contacts include upper cable contacts and upper connector contacts. The terminating ends of the upper cable contacts are configured to be terminated to cable conductors of corresponding upper cables. The terminating ends of the upper connector contacts are configured to be terminated to board contacts of a board connector connected to the host circuit board. The upper connector contacts pass through the pass-through window to an area below the central wall. The contact assembly includes a lower contact array coupled to the lower surface of the central wall of the contact organizer. The lower contact array includes lower contacts. The lower contacts include forward sections and rearward sections. The forward sections of the lower contacts extend to the front slot to mate with the module circuit card. The rearward sections have terminating ends. The lower contacts include lower cable contacts and lower connector contacts. The terminating ends of the lower cable contacts are configured to be terminated to cable conductors of corresponding lower cables. The terminating ends of the lower connector contacts are configured to be terminated to the board contacts of the board connector.

In another embodiment, an electrical connector assembly is provided and includes a board connector mounted to a host circuit board. The board connector includes board contacts electrically connected to the host circuit board. The electrical connector assembly includes a cable connector electrically connected to cables of a cable assembly. The cable connector is positioned above the board connector on the host circuit board. The cable connector includes a housing and a contact assembly received in a cavity of the housing. The electrical connector assembly includes the housing includes a top and a bottom. The housing has a front and a rear. The housing has a first side and a second side. The bottom facing the host circuit board. The housing includes the cavity at the rear. The housing includes a card slot open to the cavity at the front of the housing. The card slot configured to receive a card edge of a module circuit card of the pluggable module. The contact assembly includes a contact organizer holding an upper contact array and a lower contact array. The contact organizer has a central wall including an upper surface and a lower surface. The contact organizer includes a front slot at a front of the contact organizer aligned with the card slot to receive the card edge of the module circuit card of the pluggable module. The contact organizer includes a pass-through window through the central wall. the upper contact array coupled to the upper surface of the central wall of the contact organizer. The upper contact array includes upper contacts. The upper contacts include forward sections and rearward sections. The forward sections of the upper contacts extend to the front slot to mate with the module circuit card. The rearward sections have terminating ends. The upper contacts include upper cable contacts and upper connector contacts. The terminating ends of the upper cable contacts configured to be terminated to cable conductors of the corresponding cables. The terminating ends of the upper connector contacts configured to be terminated to the corresponding board contacts of the board connector. The upper connector contacts pass through the pass-through window to an area below the central wall. A lower contact array coupled to the lower surface of the central wall of the contact organizer. The lower contact array includes lower contacts. The lower contacts include forward sections and rearward sections. The forward sections of the lower contacts extend to the front slot to mate with the module circuit card. The rearward sections have terminating ends. The lower contacts include lower cable contacts and lower connector contacts. The terminating ends of the lower cable contacts configured to be terminated to cable conductors of the corresponding cables. The terminating ends of the lower connector contacts configured to be terminated to the board contacts of the board connector.

In a further embodiment, a receptacle connector assembly is provided and includes a receptacle cage having walls forming a module channel extending between a front and a rear of the receptacle cage. The module channel configured to receive a pluggable module through a port at the front. The receptacle cage is mounted to a host circuit board. The receptacle connector assembly includes an electrical connector assembly received in the receptacle cage at the rear to electrically connect to the pluggable module. The electrical connector assembly includes a board connector and a cable connector. The board connector mounted to the host circuit board. The board connector includes board contacts electrically connected to the host circuit board. The cable connector electrically connected to cables of a cable assembly. The cable connector is positioned above the board connector on the host circuit board. The cable connector includes a housing and a contact assembly received in a cavity of the housing. The housing includes a top and a bottom. The housing has a front and a rear. The housing has a first side and a second side. The bottom facing the host circuit board. The housing includes the cavity at the rear. The housing includes a card slot open to the cavity at the front of the housing. The card slot configured to receive a card edge of a module circuit card of the pluggable module. The contact assembly includes a contact organizer holding an upper contact array and a lower contact array. The contact organizer has a central wall including an upper surface and a lower surface. The contact organizer includes a front slot at a front of the contact organizer aligned with the card slot to receive the card edge of the module circuit card of the pluggable module. The contact organizer includes a pass-through window through the central wall. The upper contact array coupled to the upper surface of the central wall of the contact organizer. The upper contact array includes upper contacts. The upper contacts include forward sections and rearward sections. The forward sections of the upper contacts extend to the front slot to mate with the module circuit card. The rearward sections have terminating ends. The upper contacts include upper cable contacts and upper connector contacts. The terminating ends of the upper cable contacts configured to be terminated to cable conductors of the corresponding cables. The terminating ends of the upper connector contacts configured to be terminated to the corresponding board contacts of the board connector. The upper connector contacts pass through the pass-through window to an area below the central wall. The lower contact array coupled to the lower surface of the central wall of the contact organizer. The lower contact array includes lower contacts. The lower contacts include forward sections and rearward sections. The forward sections of the lower contacts extend to the front slot to mate with the module circuit card. The rearward sections have terminating ends. The lower contacts include lower cable contacts and lower connector contacts. The terminating ends of the lower cable contacts configured to be terminated to cable conductors of the corresponding cables. The terminating ends of the lower connector contacts configured to be terminated to the board contacts of the board connector.

DETAILED DESCRIPTION OF THE INVENTION

Figure 1:
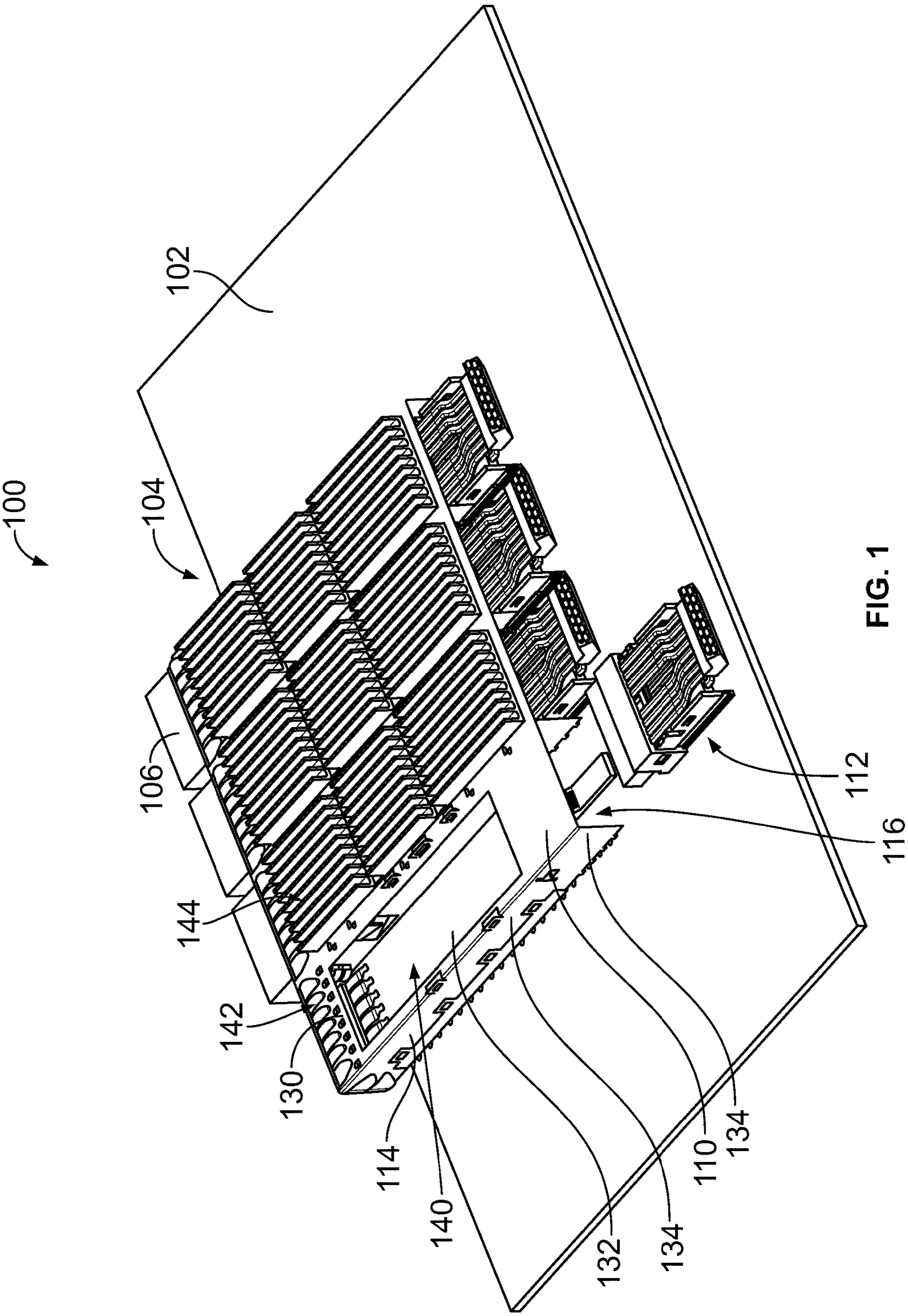
FIG. 1 is a front perspective view of a communication system formed in accordance with an exemplary embodiment.

FIG. 1 is a front perspective view of a communication system 100 formed in accordance with an exemplary embodiment. The communication system 100 includes a circuit board 102 and a receptacle connector assembly 104 mounted to the circuit board 102. Pluggable modules 106 are configured to be electrically connected to the receptacle connector assembly 104. The pluggable modules 106 may be electrically connected to the circuit board 102 through the receptacle connector assembly 104. The pluggable modules 106 may be connected to other components, such as an integrated circuit component, a chip, a microprocessor, a memory module, or another component of the communication system, through cable connectors.

In an exemplary embodiment, the receptacle connector assembly 104 includes a receptacle cage 110 and an electrical connector assembly 112 (shown in phantom) adjacent the receptacle cage 110. For example, in the illustrated embodiment, the electrical connector assembly 112 is received in the receptacle cage 110. In other various embodiments, the electrical connector assembly 112 may be located rearward of the receptacle cage 110. In various embodiments, the electrical connector assembly 112 is a electrical connector assembly and may be referred to hereinafter as a electrical connector assembly 112. The electrical connector assembly 112 may be electrically connected to the circuit board 102 by contacts of a board connector. The electrical connector assembly 112 may additionally, or alternatively, be connected to other components by cables of a cable connector.

In various embodiments, the receptacle cage 110 is enclosed and provides electrical shielding for the electrical connector assembly 112. The pluggable modules 106 are loaded into the receptacle cage 110 and are at least partially surrounded by the receptacle cage 110. The receptacle cage 110 includes a plurality of walls 114 that define one or more module channels 116 for receipt of corresponding pluggable modules 106. The walls 114 may be walls defined by solid sheets, perforated walls to allow airflow therethrough, walls with cutouts, such as for a heatsink or heat spreader to pass therethrough, or walls defined by rails or beams with relatively large openings, such as for airflow therethrough.

In the illustrated embodiment, the receptacle cage 110 constitutes a multi-port cage having multiple module channels 116. The module channels 116 may be arranged in a single row or may be stacked in multiple rows. In the illustrated embodiment, the receptacle cage 110 includes four module channels 116 arranged in a single row (for example, 1×4). However, the receptacle cage 110 may include multiple rows in alternative embodiments (for example, 2×2, 3×2, 4×2, 4×3, etc.). Any number of module channels may be provided in various embodiments. Optionally, multiple electrical connector assemblies 112 may be arranged within the receptacle cage 110 for mating with the corresponding pluggable modules 106.

In an exemplary embodiment, the walls 114 of the receptacle cage 110 include a top wall 130, a bottom wall 132, and side walls 134 extending between the top wall 130 and the bottom wall 132. The bottom wall 132 may rest on the circuit board 102. In other various embodiments, the receptacle cage 110 may be provided without the bottom wall 132. Optionally, the module channels 116 may be open at the front and the rear. However, the walls 114 of the receptacle cage 110 may include a rear wall and/or a front wall.

The walls 114 define a cavity 140, which defines one or more of the module channels 116. For example, the cavity 140 may be defined by the top wall 130, the bottom wall 132, and the side walls 134. In an exemplary embodiment, other walls 114 may separate or divide the cavity 140 into the various module channels 116. For example, the walls 114 may include divider walls between the module channels 116.

In an exemplary embodiment, the receptacle cage 110 may include one or more gaskets 142 at the front and/or the rear for providing electrical shielding for the ports to the module channels 116. For example, the gaskets 142 may be configured to electrically connect with the pluggable modules 106 and/or the electrical connector assemblies 112 received in the corresponding module channels 116. The gaskets 142 may be configured to electrically connect to a panel or bezel.

In an exemplary embodiment, the receptacle connector assembly 104 may include one or more heat sinks 144 for dissipating heat from the pluggable modules 106. For example, the heat sinks 144 may be coupled to the top wall 130 for engaging the pluggable modules 106 received in the module channels 116. The heat sinks 144 may extend through openings in the top wall 130 to directly engage the pluggable modules 106. Other types of heat sinks may be provided in alternative embodiments.

In an exemplary embodiment, each electrical connector assembly 112 is received in the cavity 140, such as at the rear. The electrical connector assembly 112 may be removable from the receptacle cage 110. In an exemplary embodiment, a portion of the electrical connector assembly 112 (for example board connector) may be fixed to the circuit board 102 and remain in the cavity while another portion of the electrical connector assembly 112 (for example, cable connector) may be removable.

In an exemplary embodiment, the pluggable modules 106 are loaded through the front to mate with the electrical connector assembly 112. The shielding walls 114 of the receptacle cage 110 provide electrical shielding around the electrical connector assembly 112 and the pluggable modules 106, such as around the mating interfaces between the electrical connector assembly 112 and the pluggable modules 106.

Figure 2:
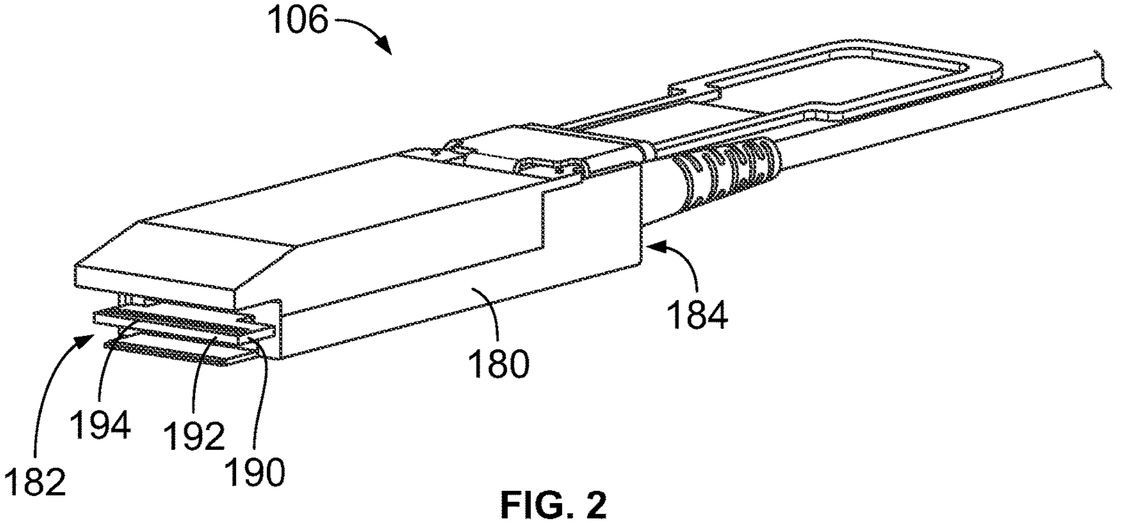
FIG. 2 is a rear perspective view of the pluggable module in accordance with an exemplary embodiment.

FIG. 2 is a rear perspective view of the pluggable module 106 in accordance with an exemplary embodiment. The pluggable module 106 has a pluggable body 180, which may be defined by one or more shells. The pluggable body 180 may be thermally conductive and/or may be electrically conductive, such as to provide EMI shielding for the pluggable module 106. The pluggable body 180 includes a mating end 182 and an opposite front end 184. The mating end 182 is configured to be inserted into the corresponding module channel 116 (shown in FIG. 1). The front end 184 may be a cable end having a cable extending therefrom to another component within the system.

The pluggable module 106 includes a module circuit card 190 that is configured to be communicatively coupled to the electrical connector assembly 112 (shown in FIG. 1). The module circuit card 190 may be accessible at the mating end 182. The module circuit card 190 has a card edge 192 extending between a first or upper surface and a second or lower surface at a mating end of the module circuit card 190. The module circuit card 190 includes mating contacts 194, such as pads or circuits, at the card edge 192 configured to be mated with the electrical connector assembly 112. In an exemplary embodiment, the mating contacts 194 are provided on the upper surface and the lower surface. The module circuit card 190 may include components, circuits and the like used for operating and or using the pluggable module 106. For example, the module circuit card 190 may have conductors, traces, pads, electronics, sensors, controllers, switches, inputs, outputs, and the like associated with the module circuit card 190, which may be mounted to the module circuit card 190, to form various circuits.

In other various embodiments, the pluggable module 106 may be a circuit card rather than an I/O module. For example, the pluggable module 106 may include the module circuit card 190 without the pluggable body 180 surrounding the module circuit card 190.

In an exemplary embodiment, the pluggable body 180 provides heat transfer for the module circuit card 190, such as for the electronic components on the module circuit card 190. For example, the module circuit card 190 is in thermal communication with the pluggable body 180 and the pluggable body 180 transfers heat from the module circuit card 190. In an exemplary embodiment, the pluggable body 180 may include a plurality of heat transfer fins along at least a portion of the outer perimeter of the pluggable module 106. The fins transfer heat away from the main shell of the pluggable body 180, and thus from the module circuit card 190 and associated components.

In alternative embodiments, the pluggable module 106 may be provided without the pluggable body 180. For example, the pluggable module 106 may simply include the module circuit card 190. For example, the module circuit card 190 may be a paddle card.

Figure 3:
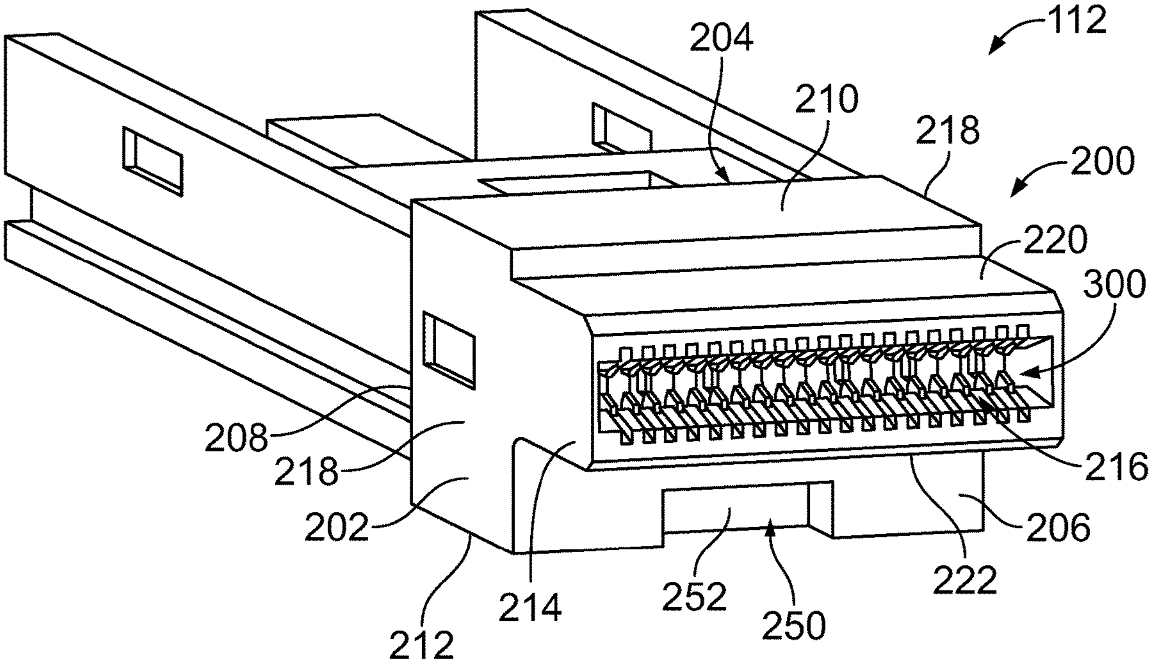
FIG. 3 is a front perspective view of the electrical connector assembly in accordance with an exemplary embodiment.
Figure 4:
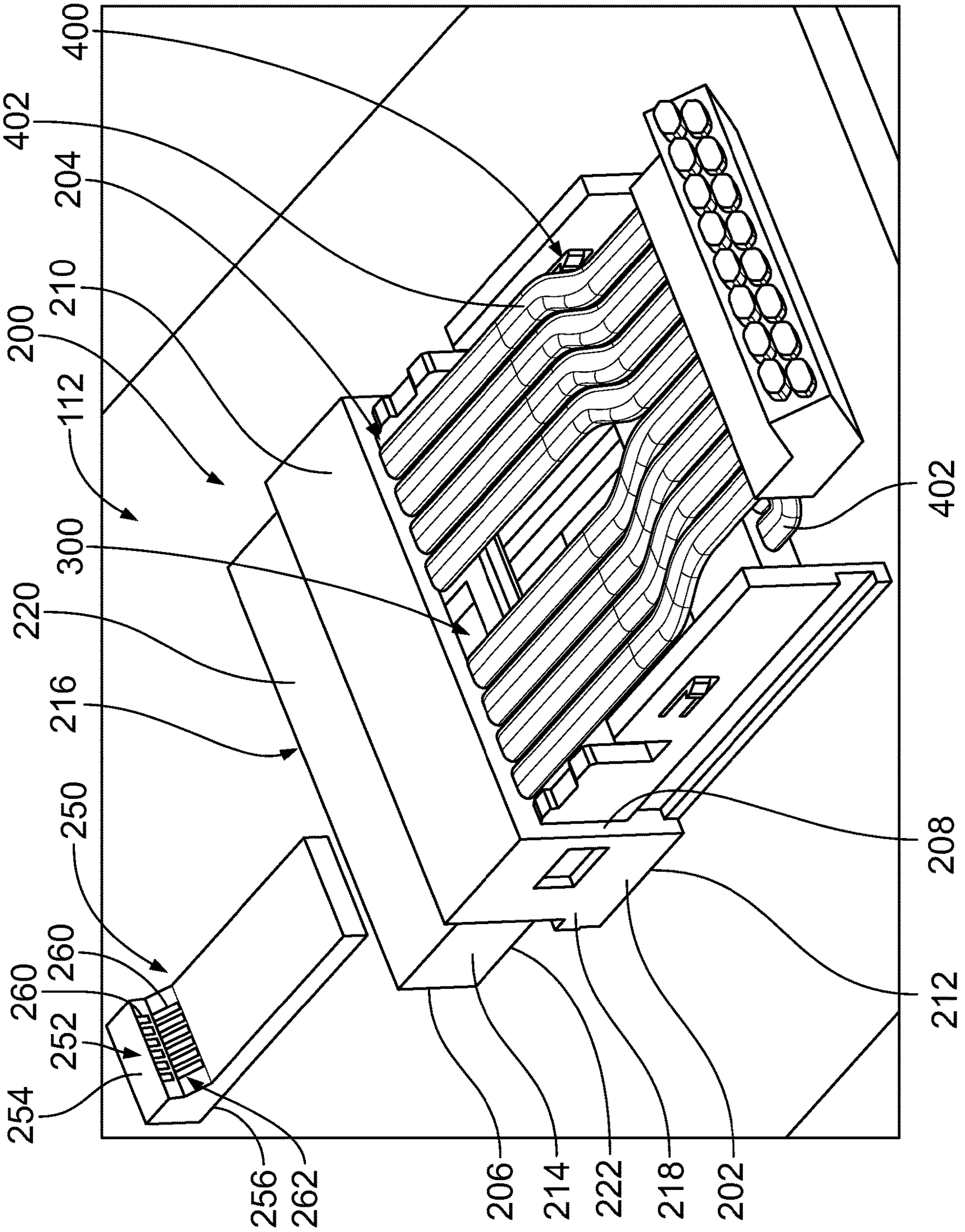
FIG. 4 is a rear, exploded perspective view of the electrical connector assembly in accordance with an exemplary embodiment.

FIG. 3 is a front perspective view of a portion of the electrical connector assembly 112 in accordance with an exemplary embodiment. FIG. 4 is a rear, exploded perspective view of the electrical connector assembly 112 in accordance with an exemplary embodiment. The electrical connector assembly 112 includes a cable connector 200 and a board connector 250. The cable connector 200 and the board connector 250 may be connected to form the electrical connector assembly 112. In an exemplary embodiment, the board connector 250 may be fixed to the circuit board 102 (shown in FIG. 1) and the cable connector 200 may be separably coupled to the board connector 250. For example, the cable connector 200 is configured to be plugged into the receptacle cage 110 and removed from the receptacle cage 110 and is coupled to the board connector 250 when plugged into the receptacle cage 110.

The cable connector 200 includes a housing 202 having a cavity 204, a contact assembly 300 received in the cavity 204, and a cable assembly 400 coupled to the contact assembly 300. The contact assembly 300 is configured to be electrically connected to the pluggable module 106 (shown in FIG. 2). The contact assembly 300 is configured to be coupled to the board connector 250. The contact assembly 300 electrically connects the pluggable module 106 to the board connector 250 and the cable assembly 400. In an exemplary embodiment, high speed signals are transmitted between the cable assembly 400 and the pluggable module 106 through the contact assembly 300. In an exemplary embodiment, low speed signals and/or power are transmitted from the board connector 250 through the contact assembly 300 to the pluggable module 106.

The housing 202 extends between a front 206 and a rear 208. The cavity 204 is open at the rear 208 to receive the contact assembly 300 and the cable assembly 400. The housing 202 extends between a top 210 and a bottom 212. The housing 202 extends between opposite sides 218. The housing 202 may be generally box shaped in various embodiments. In the illustrated embodiment, the bottom 212 defines a mounting end configured to be mounted to the host circuit board 102 (shown in FIG. 1) and the front 206 defines the mating end configured to be mated with the pluggable module 106 (shown in FIG. 1). Other orientations are possible in alternative embodiments.

The housing 202 includes a top wall 220 at the top 210 and a bottom wall 222 at the bottom 212. In the illustrated embodiment, the housing 202 includes a shroud 214 at the front 206 configured to be mated with the pluggable modules 106. The shroud 214 is a nosecone configured to be plugged into the mating ends of the pluggable module 106. The shroud 214 includes a housing card slot 216 open at the front. The housing card slot 216 receives the card edge 192 (shown in FIG. 2) of the module circuit card 190 (shown in FIG. 2). In an exemplary embodiment, the contact assembly 300 is loaded in the cavity 204 and received in the shroud 214 for mating with the pluggable module 106.

The board connector 250 includes a board housing 252 holding a plurality of board contacts 260. The board housing 252 extends between a top 254 and a bottom 256. The bottom 256 is configured to face the circuit board 102. The bottom 256 may be seated on the circuit board 102. The board housing 252 may include mounting features to secure the board connector 250 to the circuit board 102. For example, fasteners, solder tabs, press fit pins, or other types of mounting features may be used.

The board contacts 260 are configured to be mated to corresponding contacts (for example, connector contacts) of the contact assembly 300. The board contacts 260 include mating portions 262 configured to be mated to the connector contacts. The mating portions 262 may be pads, spring beams, or other types of contacts that define a separable mating interface to allow mating to and un-mating from the board contacts 260. In an exemplary embodiment, the mating portions 262 includes spring beams that are deflectable to provide a reliable, separable mating interface for the board contacts 260. The opposite ends of the board contacts 260 may be terminated to the circuit board 102. For example, the terminating ends of the board contacts 260 may include compliant pins configured to be press fit into plated vias of the circuit board 102 or may be solder tails configured to be soldered to circuits of the circuit board 102. In an exemplary embodiment, the board contacts 260 define low speed signal contacts, ground contacts, and/or power contacts.

The cable assembly 400 includes a plurality of cables 402 configured to be terminated to the contact assembly 300. The cables 402 may be arranged in multiple rows, such as upper row(s) of upper cables and lower row(s) of lower cables. In an exemplary embodiment, the cables 402 are twin-axial cables each having a pair of signal conductors arranged in the core of the cable 402. The cables 402 may be shielded cables having cable shields surrounding the pairs of signal conductors. The cables 402 may include drain wires. Other types of cables may be used in alternative embodiments, such as coaxial cables, flat flexible cables, flexible circuits, twisted pair cables, and the like. In an exemplary embodiment, the cables 402 define high speed signal cables configured to transmit high speed data signals, such as 10 Gbps, 25 Gbps, 40 Gbps, 64 Gbps, 100 Gbps, or higher.

Figure 5:
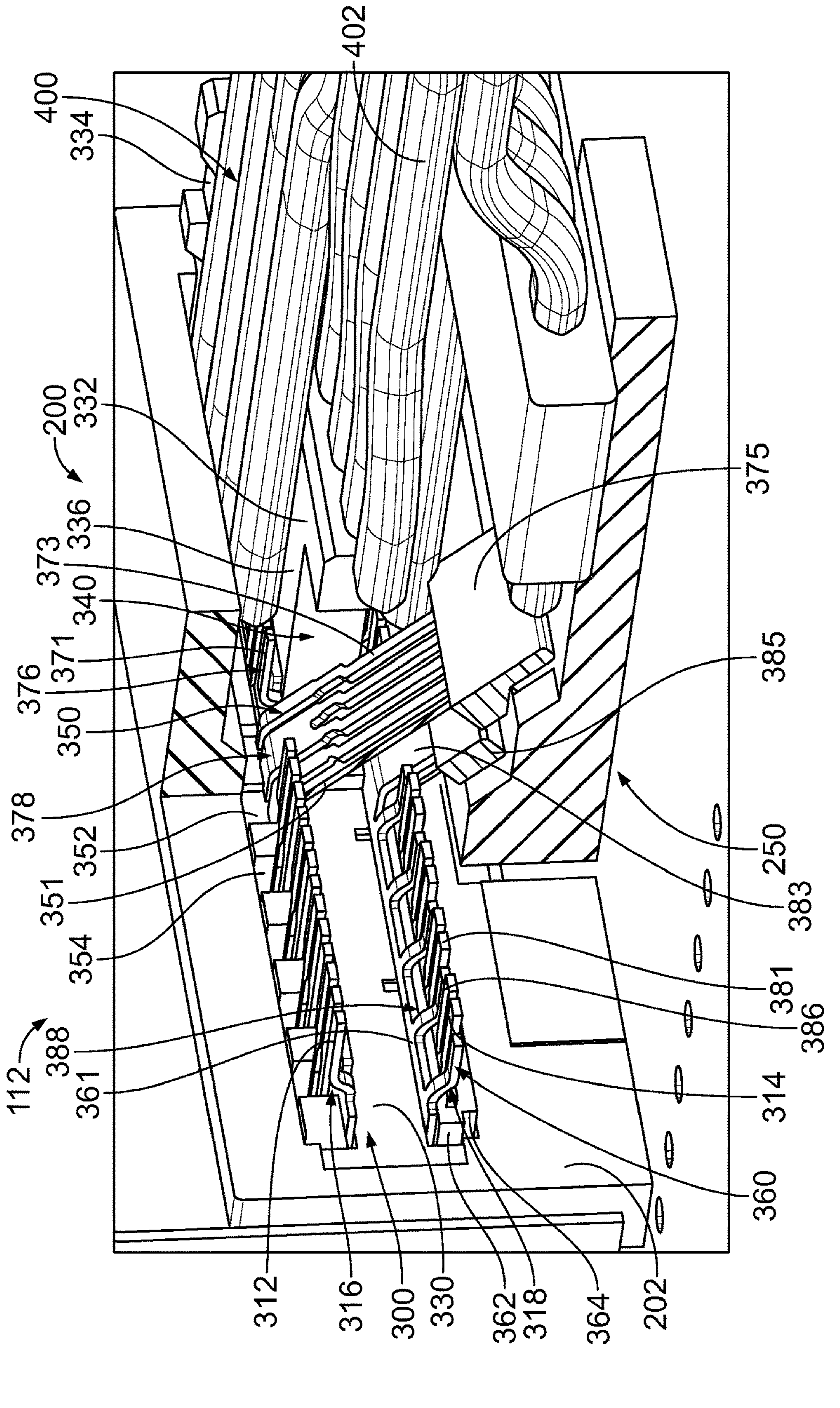
FIG. 5 is a rear perspective, partial sectional view of the electrical connector assembly in accordance with an exemplary embodiment.
Figure 6:
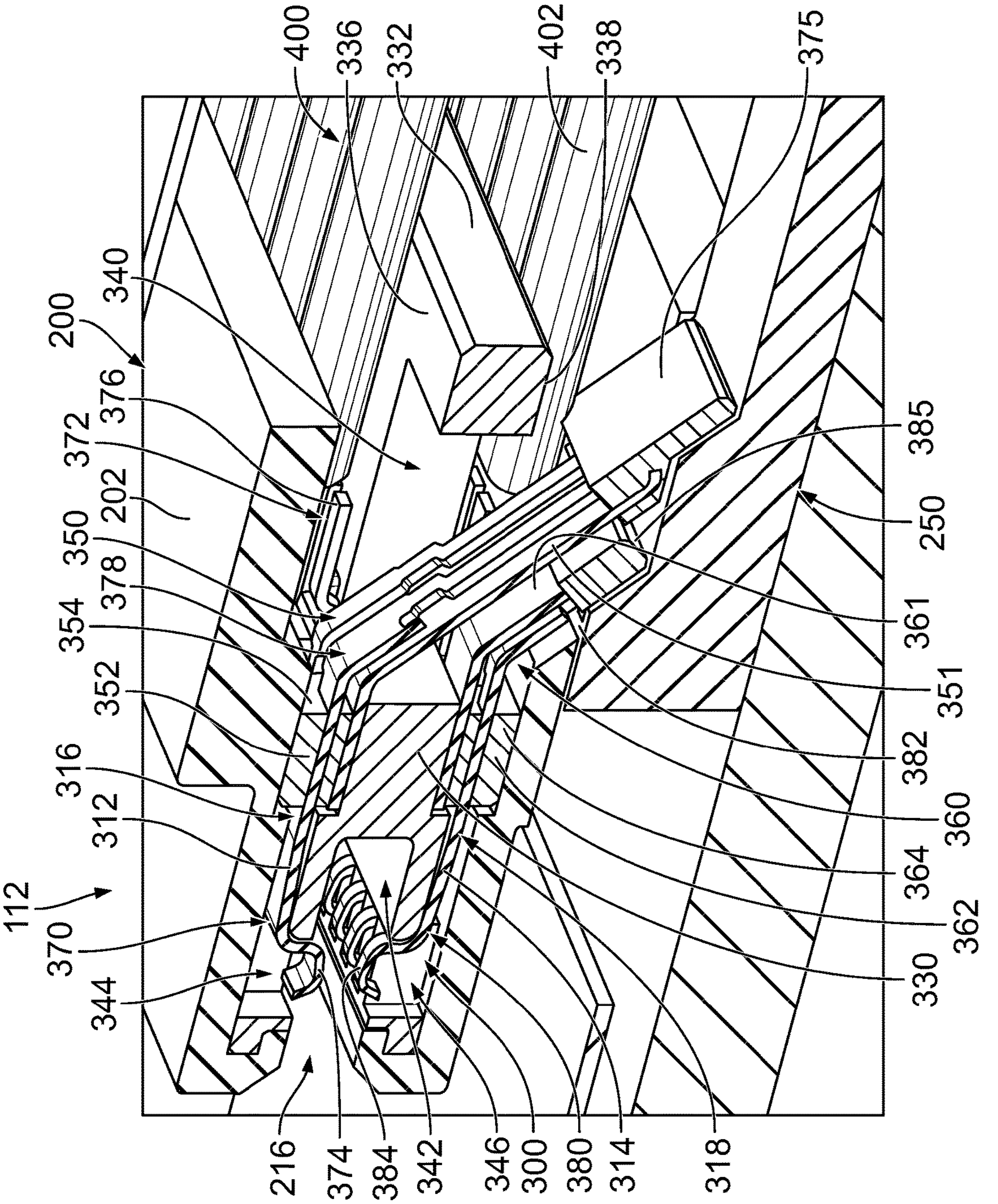
FIG. 6 is a rear perspective, partial sectional view of the electrical connector assembly in accordance with an exemplary embodiment.
Figure 7:
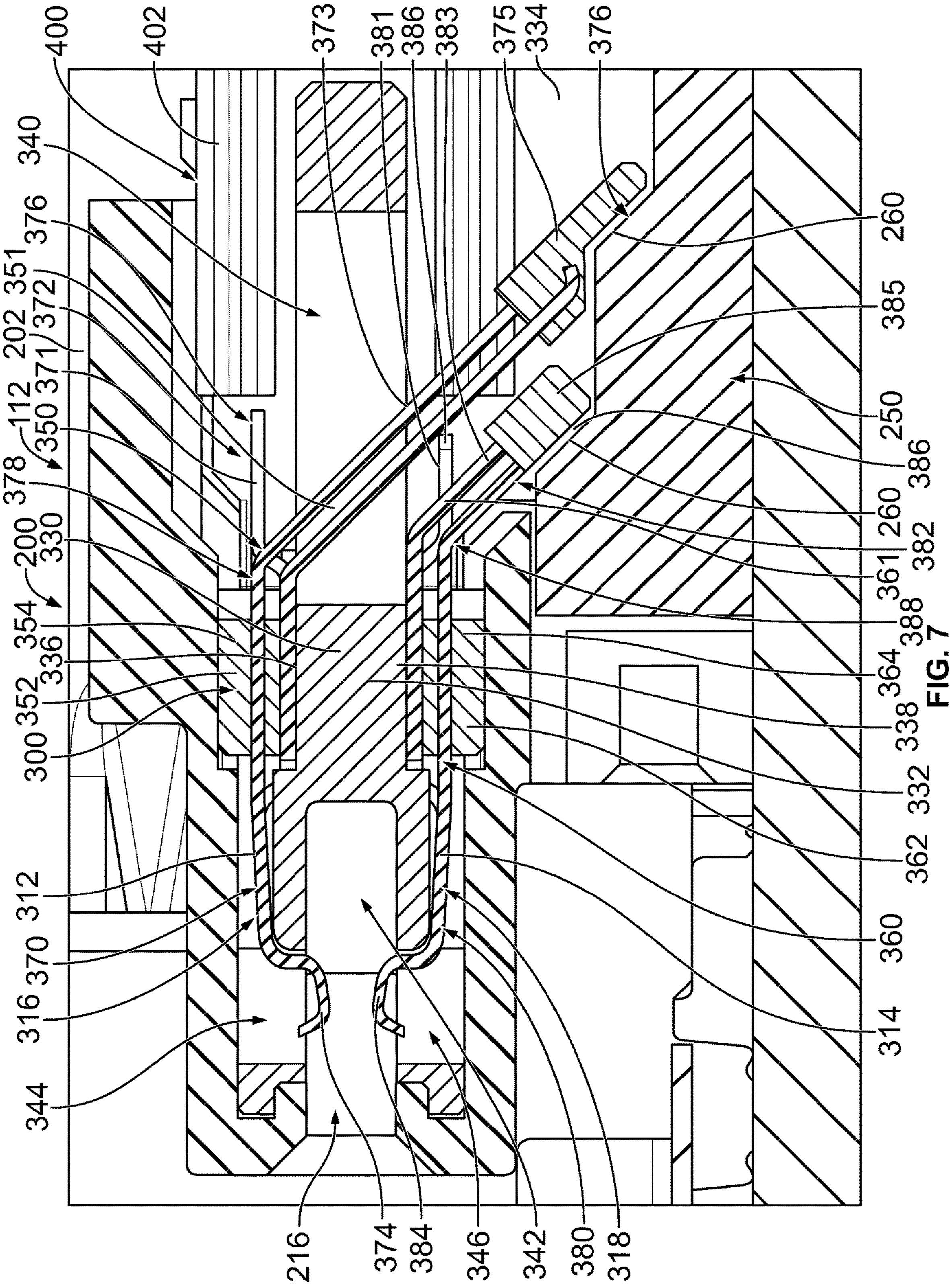
FIG. 7 is a side, cross-sectional view of the electrical connector assembly in accordance with an exemplary embodiment.

FIG. 5 is a rear perspective, partial sectional view of the electrical connector assembly 112 in accordance with an exemplary embodiment. FIG. 6 is a rear perspective, partial sectional view of the electrical connector assembly 112 in accordance with an exemplary embodiment. FIG. 7 is a side, cross-sectional view of the electrical connector assembly 112 in accordance with an exemplary embodiment.

In an exemplary embodiment, the contact assembly 300 is a double-sided, multi-row contact assembly. For example, the contact assembly 300 includes upper contacts 312 and lower contacts 314 arranged on opposite sides of the card slot 216. The upper contacts 312 are arranged in an upper contact array 316. The lower contacts 314 are arranged in a lower contact array 318. The upper contacts 312 may be arranged in multiple rows (front row and rear row) and the lower contacts 314 may be arranged in multiple rows (front row and rear row). The upper and lower contacts 312, 314 are arranged in the card slot 216 for mating with the module circuit card 190 of the pluggable module 106 (shown in FIG. 2). The contact assembly 300 has high density and significant data throughput. The upper contacts 312 and/or the lower contacts 314 may include high speed contacts, low speed contacts, ground contacts and/or power contacts.

The contact assembly 300 includes a contact organizer 330 supporting the upper contact array(s) 316 and the lower contact array(s) 318. The contact organizer 330 is used to position the upper and lower contacts 312, 314 relative to each other. The contact organizer 330 is used to hold the contact arrays 316, 318 for loading the contact assembly 300 into the housing 202. In an exemplary embodiment, the contacts 312, 314 are movable relative to the contact organizer 330 for proper alignment and positioning for mating with the pluggable module 106, for termination to the cable assembly 400, and for mating to the board connector 250.

The contact organizer 330 includes a central wall 332 extending between side walls 334 (also shown in FIG. 5). The central wall 332 includes an upper surface 336 and a lower surface 338. The central wall 332 extends to a front of the contact organizer 330. The central wall 332 may be oriented horizontally. The central wall 332 holds the upper and lower contact arrays 316, 318. For example, the upper contact array 316 is located above the upper surface 336 of the central wall 332 and the lower contact array 318 is located below the lower surface 338 of the central wall 332.

In an exemplary embodiment, the central wall 332 includes a pass-through window 340 through the central wall 332. The pass-through window 340 is open through the central wall 332 between the top and the bottom. The pass-through window 340 allows a subset of the upper contacts 312 to pass through the central wall 332 for mating with the board connector 250. In an exemplary embodiment, the central wall 332 surrounds the pass-through window 340 at a front, a rear, a first side and a second side of the pass-through window 340. The pass-through window 340 may be centered between the first and second sides of the central wall 332.

The contact organizer 330 includes a front slot 342 at the front. A portion of the central wall 332 extends above the front slot 342 and a portion of the central wall 332 extends below the front slot 342. The upper portion includes upper channels 344 that receive portions of the upper contacts 312. The lower portion includes lower channels 346 that receive portions of the lower contacts 314. The front slot 342 is configured to be aligned with the card slot 216 to receive the card edge 192 of the module circuit card 190. The upper and lower contacts 312, 314 are configured to interface with the module circuit card 190 in the front slot 342.

In an exemplary embodiment, the upper contact array 316 includes at least one leadframe 350 forming the upper contacts 312. The leadframe is a stamped and formed leadframe to form the upper contacts 312. In an exemplary embodiment, the upper contact array 316 includes a signal leadframe and a ground leadframe, which as separately stamped and formed leadframes. The signal leadframe forms the signal contacts and the ground leadframe forms the ground contacts. The ground leadframe may form a contact shield 351 that provides electrical shielding for the upper contact array 316. In alternative embodiments a single leadframe may be provided including both signal and ground contacts. In various embodiments, the upper contact array 316 may include a high speed signal leadframe forming high speed contacts and a low speed signal leadframe forming low speed contacts. However, in alternative embodiments, a single leadframe may be provided including both high speed and lower speed signal contacts. In various embodiments, the upper contact array 316 may include a first leadframe forming cable contacts configured to be terminated to cables and a second leadframe forming connector contacts configured to be connected to the board connector 250. However, in alternative embodiments, a single leadframe may be provided including both cable contacts and connector contacts.

The leadframe 350 may be overmolded with an overmolded body 352. The overmolded body 352 forms an upper contact positioner 354 used to hold the relative positions of the upper contacts 312. The upper contact positioner 354 is coupled to the contact organizer 330, such as to the upper surface 336 of the contact organizer 330. The upper contact positioner 354 may extend side-to-side across the width of the upper contact array 316 to hold each of the upper contacts 312.

In an exemplary embodiment, the lower contact array 318 includes at least one leadframe 360 forming the lower contacts 314. The leadframe is a stamped and formed leadframe to form the lower contacts 314. In an exemplary embodiment, the lower contact array 318 includes a signal leadframe and a ground leadframe, which as separately stamped and formed leadframes. The signal leadframe forms the signal contacts and the ground leadframe forms the ground contacts. The ground leadframe may form a contact shield 361 that provides electrical shielding for the lower contact array 318. In alternative embodiments a single leadframe may be provided including both signal and ground contacts. In various embodiments, the lower contact array 318 may include a high speed signal leadframe forming high speed contacts and a low speed signal leadframe forming low speed contacts. However, in alternative embodiments, a single leadframe may be provided including both high speed and lower speed signal contacts. In various embodiments, the lower contact array 318 may include a first leadframe forming cable contacts configured to be terminated to cables and a second leadframe forming connector contacts configured to be connected to the board connector 250. However, in alternative embodiments, a single leadframe may be provided including both cable contacts and connector contacts.

The leadframe 360 may be overmolded with an overmolded body 362. The overmolded body 362 forms an lower contact positioner 364 used to hold the relative positions of the lower contacts 314. The lower contact positioner 364 is coupled to the contact organizer 330, such as to the lower surface 336 of the contact organizer 330. The lower contact positioner 364 may extend side-to-side across the width of the lower contact array 318 to hold each of the lower contacts 314.

Each upper contact 312 includes a forward section 370 and a rearward section 372. The forward section 370 extends to the front slot 342 to mate with the module circuit card 190 when the module circuit card 190 is plugged into the card slot 216. In an exemplary embodiment, the forward section 370 includes a spring beam 374 having a mating interface configured to be mated with the top side of the module circuit card 190. The spring beam 374 extends along the upper portion of the central wall 332. The spring beam 374 extends into the upper channels 344 to pass into the front slot 342 to interface with the module circuit card 190. In an exemplary embodiment, the rearward section 372 includes a terminating end 376. The upper contact 312 includes a transition section 378 between the spring beam 374 and the terminating end 376. In various embodiments, the terminating end 376 may be terminated to the corresponding cable 402. In other various embodiments, the terminating end 376 may be terminated to the board connector 250.

In an exemplary embodiment, the upper contacts 312 include upper cable contacts 371 and upper connector contacts 373. In the illustrated embodiment, the upper connector contacts 373 are located in a middle section of the contact array and the upper cable contacts 371 are located at the tight and left sections, flanking the upper connector contacts 373. Other arrangements are possible in alternative embodiments. In an exemplary embodiment, the upper cable contacts 371 are configured to transmit high speed data signals and the upper connector contacts 373 are configured to transmit low speed data signals and/or power. The low speed data signals may be transmitted through the board connector 250, whereas the high speed data signals may be transmitted through the cables 402 to improve signal integrity (compared to using circuits through the host circuit board) along the cables 402, particularly for long data transmission lines.

The upper cable contacts 371 are configured to be coupled to the corresponding cables 402. For example, the terminating ends 376 of the upper cable contacts 371 include solder pads configured to be soldered to the corresponding conductor of the cable 402. The terminating ends 376 of the upper cable contacts 371 are located above the upper surface 336 of the central wall 332 to interface with the cables 402.

The upper connector contacts 373 are configured to be coupled to the board connector 250. For example, the terminating ends 376 of the upper connector contacts 373 include pads or spring beams having a separable mating interface configured to be mated to the corresponding board contacts 260 of the board connector 250. The terminating ends 376 are separable from the board contacts 260 to allow mating to and unmating from the board connector 250 as the cable connector 200 is plugged into and unplugged from the receptacle cage 110. In an exemplary embodiment, the transition sections 378 of the upper connector contacts 373 are bent downward to pass through the pass-through window 340. The terminating ends 376 of the upper connector contacts 373 are located below the lower surface 338 of the central wall 332 to interface with the board connector 250. The forward sections 370 of the upper connector contacts 373 are located above the upper surface 336 of the central wall 332 and the rearward sections 372 of the upper connector contacts 373 are located below the lower surface 338 of the central wall 332. Because the upper connector contacts 373 pass through the pass-through window 340, the board connector 250 may be located directly below the central wall 332, rather than rearward of the contact organizer 330, making the overall connector length shorter. The space behind the electrical connector assembly 112 may be used for other components rather than for use by a board connector.

In an exemplary embodiment, an upper contact holder 375 holds the terminating ends 376 of the upper connector contacts 373. The upper contact holder 375 is configured to be coupled to the board connector 250 to connect the terminating ends 376 of the upper connector contacts 373 to the board connector 250. The upper contact holder 375 may be an overmold body.

In an exemplary embodiment, the contact shield 351 extends along the transition sections 378 to provide shielding for the upper contacts 312. The contact shield 351 may be connected to the upper contact holder 375 and/or the upper contact positioner 354. For example, the contact shield 351 may be overmolded by the upper contact holder 375 and/or the upper contact positioner 354.

Each lower contact 314 includes a forward section 380 and a rearward section 382. The forward section 380 extends to the front slot 342 to mate with the module circuit card 190 when the module circuit card 190 is plugged into the card slot 216. In an exemplary embodiment, the forward section 380 includes a spring beam 384 having a mating interface configured to be mated with the module circuit card 190. The spring beam 384 extends along the lower portion of the central wall 332. The spring beam 384 extends into the lower channels 346 to pass into the front slot 342 to interface with the bottom side of the module circuit card 190. In an exemplary embodiment, the rearward section 382 includes a terminating end 386. The lower contact 314 includes a transition section 388 between the spring beam 384 and the terminating end 386. In various embodiments, the terminating end 386 may be terminated to the corresponding cable 402. In other various embodiments, the terminating end 386 may be terminated to the board connector 250.

In an exemplary embodiment, the lower contacts 314 include lower cable contacts 381 and lower connector contacts 383. In the illustrated embodiment, the upper connector contacts 383 are located in a middle section of the contact array and the upper cable contacts 381 are located at the tight and left sections, flanking the upper connector contacts 383. Other arrangements are possible in alternative embodiments. In an exemplary embodiment, the upper cable contacts 381 are configured to transmit high speed data signals and the upper connector contacts 383 are configured to transmit low speed data signals and/or power. The low speed data signals may be transmitted through the board connector 250, whereas the high speed data signals may be transmitted through the cables 402 to improve signal integrity (compared to using circuits through the host circuit board) along the cables 402, particularly for long data transmission lines.

The lower cable contacts 381 are configured to be coupled to the corresponding cables 402. For example, the terminating ends 386 of the lower cable contacts 381 include solder pads configured to be soldered to the corresponding conductor of the cable 402. The terminating ends 386 of the lower cable contacts 381 are located below the lower surface 338 of the central wall 332 to interface with the cables 402.

The lower connector contacts 383 are configured to be coupled to the board connector 250. For example, the terminating ends 386 of the lower connector contacts 383 include pads or spring beams having a separable mating interface configured to be mated to the corresponding board contacts 260 of the board connector 250. The terminating ends 386 are separable from the board contacts 260 to allow mating to and unmating from the board connector 250 as the cable connector 200 is plugged into and unplugged from the receptacle cage 110. In an exemplary embodiment, the transition sections 388 of the lower connector contacts 383 are bent downward toward the board connector 250. In an exemplary embodiment, In an exemplary embodiment, a lower contact holder 385 holds the terminating ends 386 of the lower connector contacts 383. The lower contact holder 385 is configured to be coupled to the board connector 250 to connect the terminating ends 386 of the lower connector contacts 383 to the board connector 250. The lower contact holder 385 may be an overmold body.

In an exemplary embodiment, the contact shield 361 extends along the transition sections 388 to provide shielding for the lower contacts 314. The contact shield 361 may be connected to the lower contact holder 385 and/or the lower contact positioner 364. For example, the contact shield 361 may be overmolded by the lower contact holder 385 and/or the lower contact positioner 364.

Figure 8:
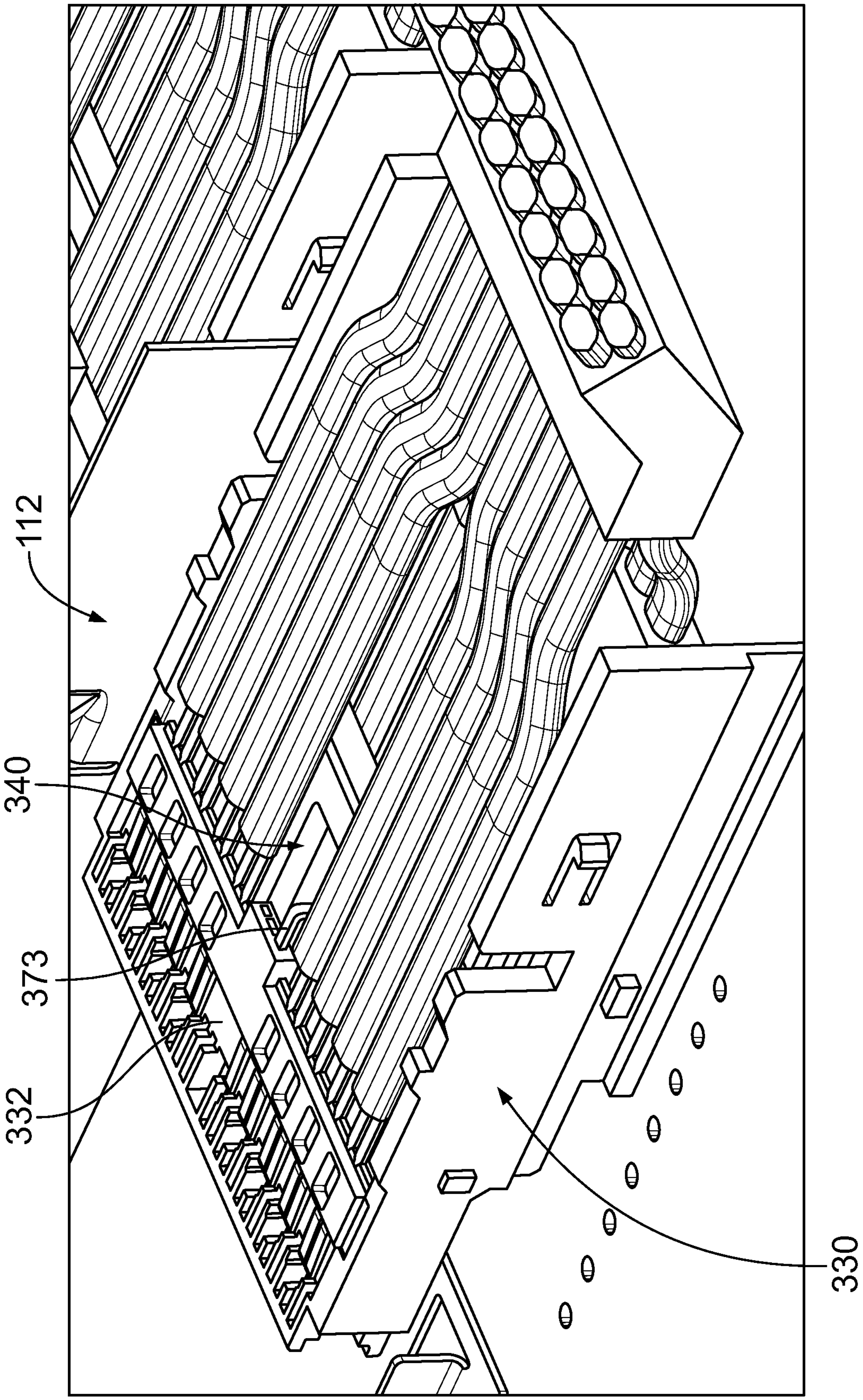
FIG. 8 is a rear perspective view of a portion of the electrical connector assembly in accordance with an exemplary embodiment.
Figure 9:
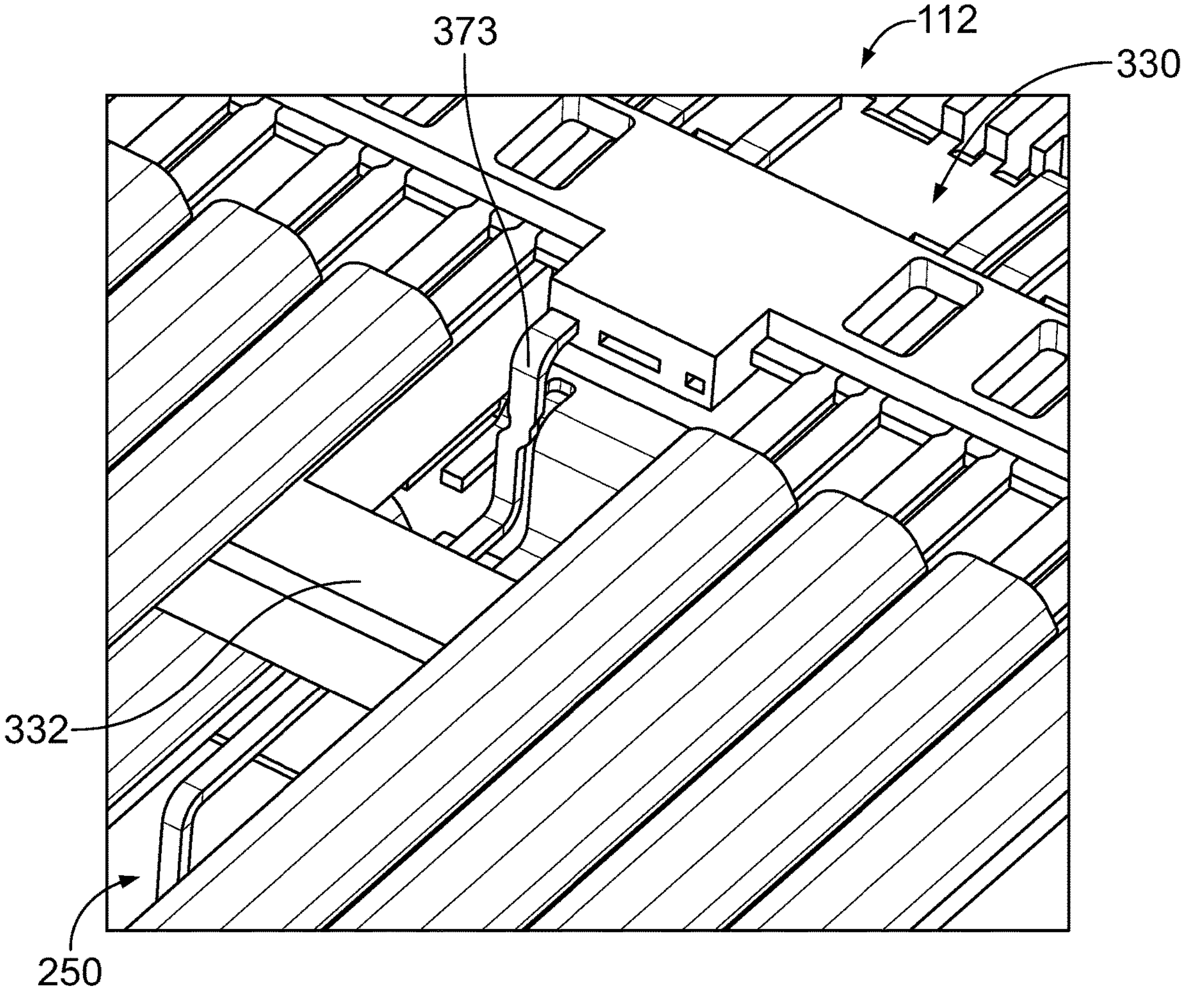
FIG. 9 is a rear perspective view of a portion of the electrical connector assembly in accordance with an exemplary embodiment.

FIG. 8 is a rear perspective view of a portion of the electrical connector assembly 112 in accordance with an exemplary embodiment. FIG. 9 is a rear perspective view of a portion of the electrical connector assembly 112 in accordance with an exemplary embodiment. FIGS. 8 and 9 illustrate the upper connector contacts 373 extending from the upper contact positioner 354 and transitioning downward to pass through the pass-through window 340. The pass-through window 340 allows the upper connector contacts 373 to pass through the central wall 332 to the space below the central wall 332 for connection to the board connector 250. Because the upper connector contacts 373 pass through the pass-through window 340, the board connector 250 may be located directly below the central wall 332, rather than rearward of the contact organizer 330, making the overall connector length shorter. The space behind the electrical connector assembly 112 may be used for other components rather than for use by a board connector.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A contact assembly comprising:

a contact organizer having a central wall including an upper surface and a lower surface, the contact organizer including a front slot at a front of the contact organizer configured to receive a card edge of a module circuit card of a pluggable module, the contact organizer including a pass-through window through the central wall;

an upper contact array coupled to the upper surface of the central wall of the contact organizer, the upper contact array including upper contacts, the upper contacts including forward sections and rearward sections, the forward sections of the upper contacts extending to the front slot to mate with the module circuit card, the rearward sections having terminating ends, the upper contacts including upper cable contacts and upper connector contacts, the terminating ends of the upper cable contacts configured to be terminated to cable conductors of corresponding upper cables, the terminating ends of the upper connector contacts configured to be terminated to board contacts of a board connector connected to the host circuit board, the upper connector contacts passing through the pass-through window to an area below the central wall; and a lower contact array coupled to the lower surface of the central wall of the contact organizer, the lower contact array including lower contacts, the lower contacts including forward sections and rearward sections, the forward sections of the lower contacts extending to the front slot to mate with the module circuit card, the rearward sections having terminating ends, the lower contacts including lower cable contacts and lower connector contacts, the terminating ends of the lower cable contacts configured to be terminated to cable conductors of corresponding lower cables, the terminating ends of the lower connector contacts configured to be terminated to the board contacts of the board connector.

2. The contact assembly of claim 1, wherein the central wall surrounds the pass-through window at a front, a rear, a first side, and a second side of the pass-through window.

3. The contact assembly of claim 1, wherein the forward sections of the upper connector contacts are located above the upper surface of the central wall and the rearward sections of the upper connector contacts are located below the lower surface of the central wall.

4. The contact assembly of claim 1, wherein the pass-through window is centered between a first side and a second side of the central wall.

5. The contact assembly of claim 1, wherein the upper contact array includes an upper contact positioner holding relative positions of the upper contacts, the upper contact positioner being coupled to the contact organizer, and wherein the lower contact array includes a lower contact positioner holding relative positions of the lower contacts, the lower contact positioner being coupled to the contact organizer.

6. The contact assembly of claim 5, wherein the upper contact array is formed from an upper leadframe, the upper contact positioner including an overmold body overmolded over the upper leadframe, and wherein the lower contact array is formed from a lower leadframe, the lower contact positioner including an overmold body overmolded over the lower leadframe.

7. The contact assembly of claim 1, wherein the upper contact array includes an upper contact holder holding the terminating ends of the upper connector contacts, the upper contact holder configured to be coupled to the board connector to connect the terminating ends of the upper connector contacts to the board connector, and wherein the lower contact array includes an lower contact holder holding the terminating ends of the lower connector contacts, the lower contact holder configured to be coupled to the board connector to connect the terminating ends of the lower connector contacts to the board connector.

8. The contact assembly of claim 1, wherein the terminating ends of the upper connector contacts include separable mating interfaces configured to be mated with the board contacts of the board connector, the terminating ends of the upper connector contacts being separable from the board contacts with the contact organizer, and wherein the terminating ends of the lower connector contacts include separable mating interfaces configured to be mated with the board contacts of the board connector, the terminating ends of the lower connector contacts being separable from the board contacts with the contact organizer.

9. The contact assembly of claim 1, wherein the terminating ends of the upper cable contacts are terminated to the cable conductors of the upper cables above the upper surface of the central wall, and wherein the terminating ends of the lower cable contacts are terminated to the cable conductors of the lower cables below the lower surface of the central wall.

10. The contact assembly of claim 1, wherein the upper contact array includes an upper contact shield extending along and shielding the upper connector contacts, and wherein the lower contact array includes a lower contact shield extending along and shielding the lower connector contacts.

11. An electrical connector assembly comprising:

a board connector mounted to a host circuit board, the board connector including board contacts electrically connected to the host circuit board; and a cable connector electrically connected to cables of a cable assembly, the cable connector being positioned above the board connector on the host circuit board, the cable connector including a housing and a contact assembly received in a cavity of the housing;

the housing including a top and a bottom, the housing having a front and a rear, the housing having a first side and a second side, the bottom facing the host circuit board, the housing including the cavity at the rear, the housing including a card slot open to the cavity at the front of the housing, the card slot configured to receive a card edge of a module circuit card of the pluggable module;

the contact assembly including a contact organizer holding an upper contact array and a lower contact array;

the contact organizer having a central wall including an upper surface and a lower surface, the contact organizer including a front slot at a front of the contact organizer aligned with the card slot to receive the card edge of the module circuit card of the pluggable module, the contact organizer including a pass-through window through the central wall;

the upper contact array coupled to the upper surface of the central wall of the contact organizer, the upper contact array including upper contacts, the upper contacts including forward sections and rearward sections, the forward sections of the upper contacts extending to the front slot to mate with the module circuit card, the rearward sections having terminating ends, the upper contacts including upper cable contacts and upper connector contacts, the terminating ends of the upper cable contacts configured to be terminated to cable conductors of the corresponding cables, the terminating ends of the upper connector contacts configured to be terminated to the corresponding board contacts of the board connector, the upper connector contacts passing through the pass-through window to an area below the central wall; and a lower contact array coupled to the lower surface of the central wall of the contact organizer, the lower contact array including lower contacts, the lower contacts including forward sections and rearward sections, the forward sections of the lower contacts extending to the front slot to mate with the module circuit card, the rearward sections having terminating ends, the lower contacts including lower cable contacts and lower connector contacts, the terminating ends of the lower cable contacts configured to be terminated to cable conductors of the corresponding cables, the terminating ends of the lower connector contacts configured to be terminated to the board contacts of the board connector.

12. The electrical connector assembly of claim 11, wherein the board connector is configured to be electrically connected to the pluggable module through the upper and lower connector contacts.

13. The electrical connector assembly of claim 11, wherein the cable connector is removably coupled to the board connector.

14. The electrical connector assembly of claim 11, wherein the terminating ends of the upper connector contacts and the lower connector contacts include separable mating interfaces configured to be removably coupled to the board contacts of the board connector when the cable connector is mated to and unmated from the board connector.

15. The electrical connector assembly of claim 11, wherein the housing includes an opening at the bottom configured to receive the board connector when the cable connector is mated to the board connector.

16. The electrical connector assembly of claim 11, wherein the upper contact array includes an upper contact positioner holding relative positions of the upper contacts, the upper contact positioner being coupled to the contact organizer, and wherein the lower contact array includes a lower contact positioner holding relative positions of the lower contacts, the lower contact positioner being coupled to the contact organizer.

17. The electrical connector assembly of claim 11, wherein the upper contact array includes an upper contact holder holding the terminating ends of the upper connector contacts, the upper contact holder configured to be coupled to the board connector to connect the terminating ends of the upper connector contacts to the board connector, and wherein the lower contact array includes an lower contact holder holding the terminating ends of the lower connector contacts, the lower contact holder configured to be coupled to the board connector to connect the terminating ends of the lower connector contacts to the board connector.

18. A receptacle connector assembly comprising:

a receptacle cage having walls forming a module channel extending between a front and a rear of the receptacle cage, the module channel configured to receive a pluggable module through a port at the front, the receptacle cage being mounted to a host circuit board; and an electrical connector assembly received in the receptacle cage at the rear to electrically connect to the pluggable module, the electrical connector assembly including a board connector and a cable connector;

the board connector mounted to the host circuit board, the board connector including board contacts electrically connected to the host circuit board; and the cable connector electrically connected to cables of a cable assembly, the cable connector being positioned above the board connector on the host circuit board, the cable connector including a housing and a contact assembly received in a cavity of the housing;

the housing including a top and a bottom, the housing having a front and a rear, the housing having a first side and a second side, the bottom facing the host circuit board, the housing including the cavity at the rear, the housing including a card slot open to the cavity at the front of the housing, the card slot configured to receive a card edge of a module circuit card of the pluggable module;

the contact assembly including a contact organizer holding an upper contact array and a lower contact array;

the contact organizer having a central wall including an upper surface and a lower surface, the contact organizer including a front slot at a front of the contact organizer aligned with the card slot to receive the card edge of the module circuit card of the pluggable module, the contact organizer including a pass-through window through the central wall;

the upper contact array coupled to the upper surface of the central wall of the contact organizer, the upper contact array including upper contacts, the upper contacts including forward sections and rearward sections, the forward sections of the upper contacts extending to the front slot to mate with the module circuit card, the rearward sections having terminating ends, the upper contacts including upper cable contacts and upper connector contacts, the terminating ends of the upper cable contacts configured to be terminated to cable conductors of the corresponding cables, the terminating ends of the upper connector contacts configured to be terminated to the corresponding board contacts of the board connector, the upper connector contacts passing through the pass-through window to an area below the central wall; and a lower contact array coupled to the lower surface of the central wall of the contact organizer, the lower contact array including lower contacts, the lower contacts including forward sections and rearward sections, the forward sections of the lower contacts extending to the front slot to mate with the module circuit card, the rearward sections having terminating ends, the lower contacts including lower cable contacts and lower connector contacts, the terminating ends of the lower cable contacts configured to be terminated to cable conductors of the corresponding cables, the terminating ends of the lower connector contacts configured to be terminated to the board contacts of the board connector.

19. The receptacle connector assembly of claim 18, wherein the board connector is configured to be electrically connected to the pluggable module through the upper and lower connector contacts.

20. The receptacle connector assembly of claim 18, wherein the terminating ends of the upper connector contacts and the lower connector contacts include separable mating interfaces configured to be removably coupled to the board contacts of the board connector when the cable connector is mated to and unmated from the board connector.

* * * * *